(12) United States Patent
Spannbauer

(10) Patent No.: US 8,146,701 B2
(45) Date of Patent: Apr. 3, 2012

(54) COMPONENT FOR INSTALLATION UNDER THE HOOD OF A MOTOR VEHICLE

(75) Inventor: Helmut Spannbauer, Möglingen (DE)

(73) Assignee: Mann + Hummel GmbH, Ludwigsburg (DE)

(*) Notice: Subject to any disclaimer, the term of this patent is extended or adjusted under 35 U.S.C. 154(b) by 204 days.

(21) Appl. No.: 12/208,039

(22) Filed: Sep. 10, 2008

(65) Prior Publication Data
US 2009/0223732 A1     Sep. 10, 2009

(30) Foreign Application Priority Data
Sep. 11, 2007 (DE) ................. 20 2007 012 689 U

(51) Int. Cl.
*B60R 21/34* (2011.01)
(52) U.S. Cl. ... 180/274; 180/271; 180/281; 296/187.04; 296/193.11; 280/748
(58) Field of Classification Search .............. 180/68.1, 180/68.3, 68.6, 281, 271, 274; 280/727, 280/748; 296/187.04, 193.11
See application file for complete search history.

(56) References Cited

U.S. PATENT DOCUMENTS
2009/0085374 A1* 4/2009 Takei .............. 296/187.09

FOREIGN PATENT DOCUMENTS

| DE | 102004007284 | | 9/2005 |
|---|---|---|---|
| DE | 102004007284 A1 * | | 9/2005 |
| DE | 102004054274 | | 5/2006 |
| EP | 1426237 | | 6/2004 |
| EP | 1426237 A1 * | | 6/2004 |
| FR | 2879538 | | 6/2006 |
| FR | 2879538 A1 * | | 6/2006 |
| JP | 2000308234 A | * | 11/2000 |
| JP | 200557842 A | * | 3/2005 |
| WO | WO 2006051072 A1 * | | 5/2006 |

OTHER PUBLICATIONS

Linhart et al., Component Located Under the Engine Hood of a Motor Vehicle, May 18, 2006, WIPO, WO 2006/051072 A1, English Abstract.*
Linhart et al., Component Located Under the Engine Hood of a Motor Vehicle, May 18, 2006, WIPO, WO 2006/051072 A1, Machine Translation of Description.*
Bauer et al., Component Mounted with a Small Gap Under the Bodywork of a Vehicle in a Pedestrian Impact Region, Jun. 9, 2004, EPO, EP 1 426 237 A1, English Abstract.*

(Continued)

*Primary Examiner* — Toan C To
*Assistant Examiner* — James English

(57) ABSTRACT

A component, especially a part of an intake system or an air filter, for installation under the hood of a motor vehicle has a housing with a first housing part and a second housing part that are connected to one another. The first housing part is of a two-part configuration and has a support frame and a receiving part. The support frame is supported on the second housing part. The receiving part and the support frame are secured relative to one another by a releasable connection. The releasable connection is designed such that, when an external force acts on the receiving part, the releasable connection is released and the receiving part and the support frame slide telescopingly into one another.

17 Claims, 2 Drawing Sheets

OTHER PUBLICATIONS

Bauer et al., Component Mounted with a Small Gap Under the Bodywork of a Vehicle in a Pedestrian Impact Region, Jun. 9, 2004, EPO, EP 1 426 237 A1, Machine Translation of Description.*

Wolfgang Kerner, Housing for air conditioning system in vehicle has a crush construction to minimise injury to persons especially pedestrians falling onto the engine cover, Sep. 1, 2005, German Patent Office, DE 10 2004 007 284 A1, Machine Translation of Description.*

EP search report EP 08 16 3917.

* cited by examiner

COMPONENT FOR INSTALLATION UNDER THE HOOD OF A MOTOR VEHICLE

BACKGROUND OF THE INVENTION

The present invention relates to a component for installation under the hood of a motor vehicle, in particular, an intake system for an internal combustion engine, preferably an air filter. The component comprises a housing, comprised of a first housing part and a second housing part connected to one another, wherein the connection is released when an external force acts onto one housing part so that the housing parts can slide into one another in a telescoping fashion.

WO 2006/051072 A1 discloses an air filter in an intake system of an internal combustion engine which air filter has a deformable housing in order to improve the impact protection for pedestrians. The reason for this is the desire to reduce the danger to persons that impact on the hood of a motor vehicle in case of an accident. The severity of the accident can be reduced by making the hood deformable; this however requires that under the hood there is a free space or that components that are positioned immediately under the hood are configured to be greatly deformable.

In order to fulfill these requirements, according to WO 2006/051072 A1 the air filter housing is of a two-part construction with a bottom housing part and a top housing part that, in the regular mounted position, are locked with one another and delimit a receiving space for an air filter element. The locking connection secures the housing parts under regular operating conditions in the mounted position. However, when a force that surpasses the locking force is applied from above onto the top housing part, which is the case, for example, upon impact on the hood, the locking connection is released and the top housing part is pushed telescopingly into the bottom housing part.

Based on this, it is an object of the present intention to provide with simply constructive measures a component that is suitable for installation under the hood of a motor vehicle and ensures an excellent impact protection.

SUMMARY OF THE INVENTION

In accordance with the present invention, this object is solved in that the first housing part is of a two-part configuration and is comprised of a support frame and a receiving part, wherein the support frame is supported on the second housing part and the receiving part and the support frame are connected to one another by a releasable connection.

The component according to the invention that is provided for installation under the hood of a motor vehicle comprises a housing comprised of a first housing part and a second housing part that are connected to one another by a clamping connection. This clamping connection is released when an external force that surpasses a threshold value acts on the clamping connection so that the housing parts will slide into one another telescopingly.

According to the invention, the first housing part is of a two-part configuration and is comprised of a support frame and a receiving part wherein the support frame is supported on the second housing part. The receiving part and the support frame are connected to one another by a releasable clamping connection. In this way it can be ensured that the telescoping sliding action of parts of the housing is realized by a relative movement between the support frame and the receiving part wherein the support frame and the receiving part are both components of the first housing part. In this way, the tasks are divided in that the support frame provides the connection to the second housing part and the receiving part enables the telescoping sliding action that is required for improvement of the impact protection. As a result of this separation of the tasks/functions, the support frame and the receiving part can be optimally adjusted to their respective task; this can be realized particularly with simple inexpensive measures.

For example, the load limit that is set so that, when surpassed, the components of the first housing part slide relative to one another can be realized in a constructively simple way by measures that concern exclusively the receiving part but not the support frame, for example, by providing a step on the wall of the receiving part that rests immediately against the support frame. This step is part of a positive-locking connection between support frame and receiving part that, under normal conditions, prevents a telescoping sliding action of the components of the first housing part. Only when the load limit is surpassed, the walls of the receiving part can deform and yield in a direction transverse to the sliding direction so that the step on the wall of the receiving part is no longer supported on the support frame and the positive-locking connection is canceled so that the receiving part can slide relative to the support frame.

The connection between support frame and receiving part is preferably not designed as a rated breakpoint but as a destruction-free locking (latching) or positive-locking connection. This has the advantage that even after a telescoping sliding of the components of the first housing part into one another has happened, the component is not destroyed and can still be used. The release of the connection is realized advantageously by the flexibility of the receiving part that enables that at least one wall of the receiving part when surpassing the load limit can yield in a direction transverse to the sliding direction so that the connection is released or canceled. In principle, it is however also possible that this movement of the receiving part is not achieved by the flexibility of the receiving part but by a mechanical degree of freedom, for example, by means of a joint or hinge provided on the receiving part. Moreover, it is conceivable that, additionally or alternatively to the enabled movement of the wall of the receiving part, also a wall section of the support frame is either elastic or flexible or provided with a mechanical degree of freedom to enable a yielding action.

According to an advantageous embodiment, it is provided that the receiving part can move freely (without any hindrance) along the second housing part. In this way it is ensured that the load limit is exclusively adjusted by the connection between the receiving part and the support frame so that the connection between these individual parts of the component is responsible for the level of the connecting force. The second housing part has only a supporting function for the individual parts of the first housing part without being responsible for the adjustment of the load limit. Instead, the receiving part can move relative to the second housing part as soon as the load limit set between the receiving part and support frame has been surpassed.

In an expedient further embodiment the receiving part is tub-shaped wherein the support frame supports at least one sidewall of the receiving part. Preferably, the support frame is of an annular configuration and surrounds the receiving part so that the receiving part in the radial direction rests with all sides against the support frame. In contrast to this, the connecting elements between the sidewalls of the receiving part and the support frame must not inevitably extend about the entire circumference; it is sufficient that at least two connecting elements distributed about the circumference are provided between the support frame and the sidewalls of the receiving part. However, it can be expedient to provide annular circumferentially extending connecting elements, for example, a step on the wall of the receiving part that rests against the end face of the support frame.

According to a further advantageous embodiment, the free end face of the receiving part positive-lockingly engages the support frame. In this way, the receiving part is securely clamped on the support frame so that an accidental detachment of the receiving part from the second housing part, in a direction opposite to the telescoping sliding action, is prevented or excluded. The support frame can be fixedly connected to the second housing part, for example, by screwing or welding or a snap-on connection or the like.

In order to ensure a sealing function between the housing parts and for the interior enclosed by the housing parts relative to the ambient, a sealing element is provided between support frame and second housing part. This sealing element is inserted in particular into a peripherally extending step that is formed in the area of the free end face of the second housing part and is delimited by at least one sidewall or end face of the support frame so that the step has the shape of an annular groove that is advantageously open toward the interior of the housing. In this way, it is possible to arrange the sealing ring on a functional element that is positioned in the interior of the housing, for example, on an air filter element.

BRIEF DESCRIPTION OF THE DRAWINGS

Further advantages and expedient modifications of the invention will be explained in more detail in connection with preferred embodiments illustrated in the drawings.

In the Figures the same elements, if not indicated otherwise, are identified with same reference numerals.

DESCRIPTION OF THE PREFERRED EMBODIMENTS

In the illustrated embodiments, an air filter for installation in the intake system of an internal combustion engine is illustrated. In principle, in the context of the present invention, the inventive principle can be applied to other components that are to be arranged under the hood of a motor vehicle, for example, intake conduits of the intake system.

Figure 1:
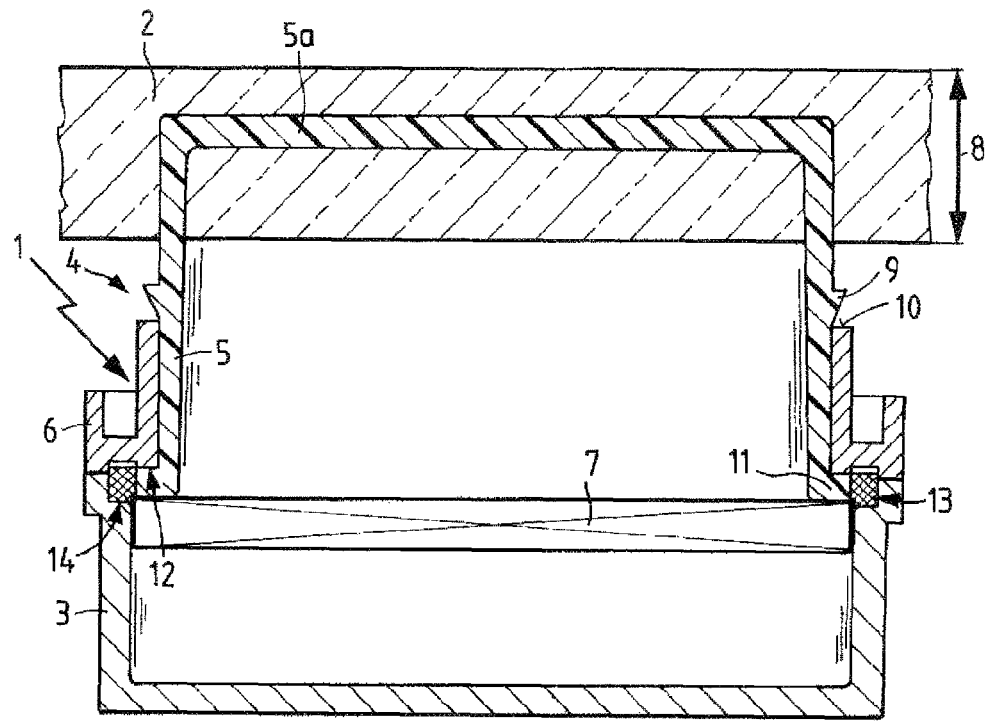
FIG. 1 shows a section of an air filter for an internal combustion engine that is installed under the hood of a motor vehicle wherein, between the hood and the top housing part of the air filter, a free space is provided as impact protection and this free space can be enlarged by axial sliding of the top housing part relative to the bottom housing part of the air filter.

The air filter 1 illustrated in FIG. 1 is arranged under the hood 2 of a motor vehicle and is comprised of a bottom housing part 3 and a top housing part 4 that delimit a receiving space in which air filter element 7 is arranged. The top housing part 4 is of a two-part configuration and is comprised of a tub-shaped or hood-shaped receiving part 5 and a support frame 6 that surrounds annularly the sidewalls of the receiving part 5.

Figure 2:
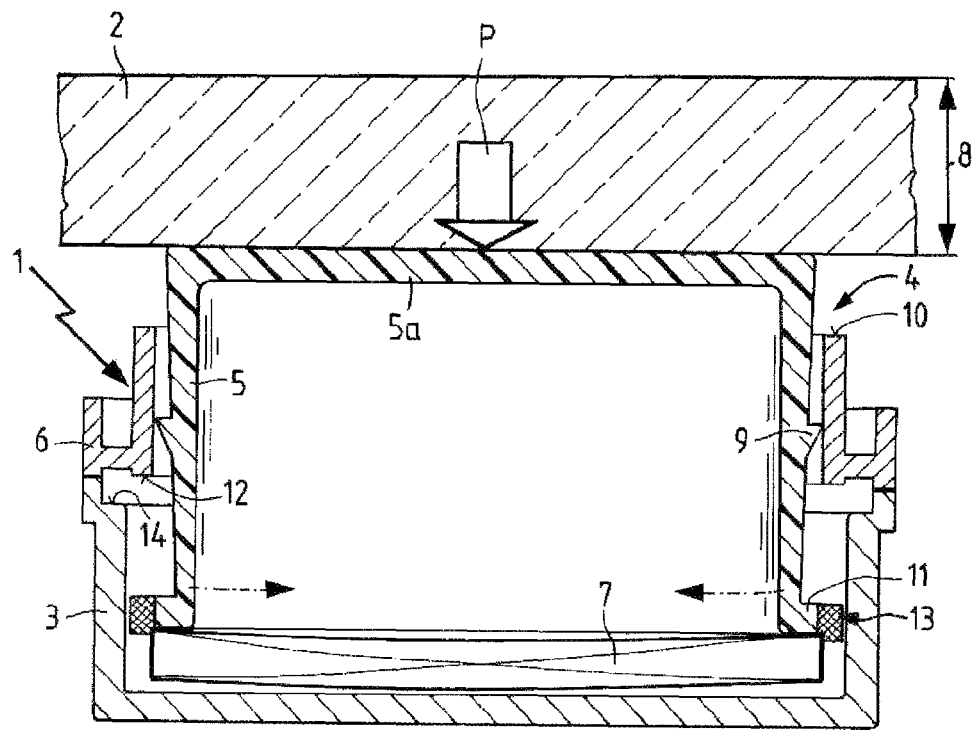
FIG. 2 shows the air filter with the top housing part telescopingly moved relative to the bottom housing part wherein the top housing part is comprised of a tub-shaped or hood-shaped receiving part and an annular support frame surrounding the receiving part, wherein the receiving part relative to the fixedly arranged support frame has been axially moved.

Immediately under the hood 2, for reasons of improved impact protection, a free space is provided that is identified by arrow 8. The top side 5a of the receiving part 5 projects into this free space 8 which however is permissible only when the receiving part 5 in case of impact can be moved out of the free space 8. In order to be able to realize this, the receiving part 5 can be pushed telescopingly into the surrounding bottom housing part 3—this is illustrated in FIG. 2—so that the free space 8 under the hood 2 after impact on the exterior side of the hood 2 is free of parts of the air filter 1.

The telescoping sliding action of the receiving part 5 relative to the support frame 6 and to the bottom housing part 3 is realized upon surpassing a load limit. The load limit is adjusted by means of a locking connection between the exterior side of the sidewall of the receiving part 5 and the support frame 6 for which purpose on the exterior side of the sidewall of the receiving part 5 an outwardly projecting step 9 that is triangular in cross-section is formed as an integral part. In the regular operating position of the air filter (FIG. 1) the step 9 rests against the correlated end face 10 of the support frame 6. As a result of the triangular shape or wedge shape of the step 9 and because of the elasticity of the walls of the receiving part 5, the walls can yield inwardly in the transverse direction when a force p (FIG. 2) is acting from above onto the receiving part 5 so that the locking connection between the step 9 and the support frame 6 is released or canceled and the receiving part 5, as shown in FIG. 2, with the step 9 resting on the inner side of the support frame 6, is displaced downwardly in the direction of the bottom housing part 3.

The receiving part 5 has in the area of the free end face that is facing the bottom housing part 3 a radially outwardly projecting integral collar 11 that, in the operating position according to FIG. 1, engages the facing end face 12 of the support frame 6. In this way, the receiving part 5 is secured against accidental release from the air filter. This collar 11 rests at the same time on the top side of the air filter element 7 that, upon axial displacement of the receiving part 5 in the direction of the bottom housing part 3 (FIG. 2), is moved together with the receiving part 5.

In order to enable, on the one hand, movability of the air filter element 7 in the case of impact and, on the other hand, to secure the air filter element 7 in regular operating position in a predetermined position within the receiving space in the air filter, on the air filter element 7 an annular, circumferentially extending sealing element 13 is arranged that is positioned in the area of the radially outwardly positioned side of the air filter element 7. This sealing element 13 rests on a circumferentially extending housing step 14 that is provided adjacent to the free end face of the bottom housing part 3. The support frame 6 is placed onto the end face of the housing part 3 and is preferably fixedly connected to the bottom housing part 3, for example, by welding or screwing. The housing step 14 is supplemented by the support frame 6 to an annular groove into which this sealing element 13 is inserted (FIG. 1). The collar 11 on the end face of the receiving part 5 encloses the sealing element 13 in this groove. As a result of the flexibility of this sealing element 13, this sealing element 13 can escape from the groove in case of impact on the hood 2 so that the filter element 7 together with the receiving part 5 can be displaced in the direction of the bottom of the bottom housing part 3.

Figures 3A, 3B, 3C:
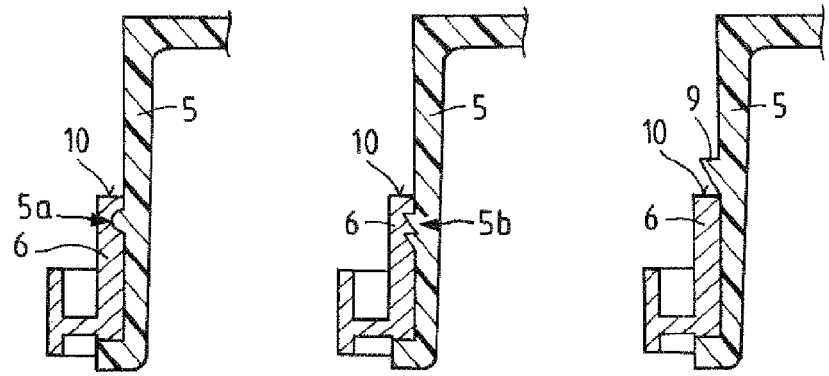
FIGS. 3a to 3c show different embodiments of the releasable connection between the sidewall of the receiving part and the support frame.

In the FIGS. 3a to 3c different variants of a latching or positive-locking connection between the exterior side of the wall of the receiving part 5 and the support frame 6 are illustrated. According to FIG. 3a, on the exterior side of the wall of the receiving part 5 a nub 5a is formed as an integral part and a matching recess is provided in the inner side of the support frame 6. As a result of the part-spherical surface of the nub 5a, the nub 5a can be lifted out of the correlated recess in the support frame 6 when the receiving part 5 is subjected to a displacement load.

In FIG. 3b the connection between receiving part 5 and support frame 6 is illustrated as a triangular or wedge-shaped projection 5b that projects past the exterior wall of the receiving part 5 and is formed as an integral part thereof. It engages a matching recess in the inner side of the support frame 6. Expediently, in the axial direction two such projections are arranged immediately behind one another; the wedge shape of the projection 5b facilitates axial displacement of the receiving part 5 in case of a load from above.

The embodiment of FIG. 3c corresponds to that of the FIGS. 1 and 2 and comprises a wedge or step 9 on the exterior side of the receiving part 5 that rests in the regular position on the free end face 10 of the support frame 6.

Figure 4:
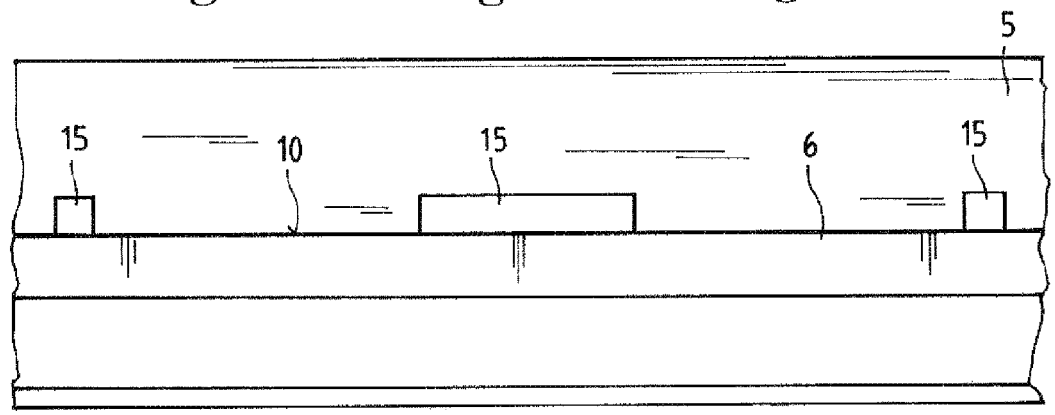
FIG. 4 shows a side view of the air filter housing with different positions of the connecting parts between support frame and receiving part.

As can be seen in the side view according to FIG. 4, several connections 15 between the receiving part 5 and the support frame 6 can be distributed about the circumference. These connections 15, formed in an exemplary fashion according to the embodiments of FIGS. 3a to 3c, can have different lengths in the circumferentially direction.

Figures 5, 6:
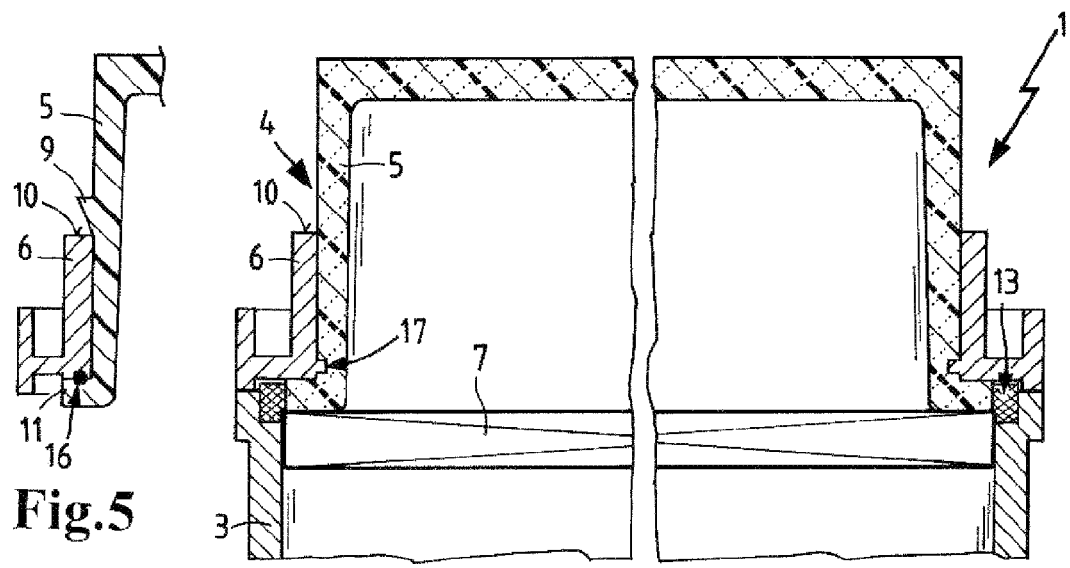
FIG. 5 shows a further embodiment variant with a sealing ring between support part and receiving part.
FIG. 6 is a further embodiment of the air filter whose receiving part is made from hard foam wherein the connection between the support frame and the exterior wall of the receiving part is illustrated in yet another embodiment.

As shown in FIG. 5, between the collar 11 in the area of the end face of the receiving part 5 and the facing end face of the support frame 6, a sealing ring 16 can be inserted in order to achieve a safe sealing action of the interior of the filter relative to the ambient.

In FIG. 6 a further embodiment of an air filter 1 is illustrated whose top housing part, like in the embodiments according to FIGS. 1 and 2, is comprised of hood-shaped receiving part 5 and a support frame 6. However, the receiving part 5 is made from hard foam material, while in the preceding embodiments the receiving part 5 is made of plastic material, in particular a plastic material that can be injection-molded. Since the hard foam has reduced elasticity or flexibility, the latching or positive-locking connection between the exterior side of the receiving part 5 and the inner side of the support frame 6 is not very pronounced. In this connection, a small projecting pin 17 on the inner wall of the support frame 6 engages a matching recess in the exterior wall of the receiving part 5.

While specific embodiments of the invention have been shown and described in detail to illustrate the inventive principles, it will be understood that the invention may be embodied otherwise without departing from such principles.

What is claimed is:

1. A component for installation under a hood of a motor vehicle, the component comprising:
   a housing comprised of
      a first housing part; and
      a second housing part;
         wherein said first and second housing parts are connected to one another;
      wherein said first housing part is of a two-part configuration and comprised of
         a support frame; and
         a receiving part;
   wherein said support frame is supported on said second housing part;
   wherein said receiving part and said support frame are secured relative to one another by a releasable destruction-free latching connection;
   wherein after said connection is released, said connection is not destroyed and can be re-latched and reused;
   wherein said support frame is slideably received over said receiving part then latching to said receiving part;
   wherein said releasable connection is designed such that, when an external force acts on said receiving part, said releasable connection is released and said receiving part and said support frame slide telescopingly into one another in a sliding direction;
   wherein said receiving part is tub-shaped;
   wherein said releasable connection is arranged between sidewalls of said receiving part and of said support frame;
   wherein a first one of said sidewalls is an axially extending sidewall of said support frame;
   wherein a second one of said sidewalls is an axially extending sidewall of said receiving part;
   wherein said releasable latching connection includes a first connection portion provided on said first side wall latching to a second connection provided on said second sidewall; and
   wherein said support frame annularly surrounds said receiving part.

2. A component for installation under a hood of a motor vehicle, the component comprising:
   a housing comprised of
      a first housing part and
      a second housing part
         wherein said first and second housing parts are connected to one another;
      wherein said first housing part is a telescoping sliding two-part configuration:
         a tub-shaped receiving part; and
         a support frame that surrounds annularly sidewalls of said receiving part and telescopically slideable on said receiving part;
   wherein said support frame is supported on said second housing part;
   wherein said receiving part and said support frame are secured relative to one another by a releasable destruction-free latching connection;
   wherein after said connection is released, said connection is not destroyed and can be re-latched and reused;
   wherein said support frame is slideably received over said receiving part then latching to said receiving part;
   wherein said releasable connection is designed such that, when an external force acts on said receiving part, said releasable connection is released and said receiving part and said support frame slide telescopingly into one another in a sliding direction; and
   wherein said support frame is an annular ring-shaped component that continuously and completely annularly surrounds said receiving part.

3. The component according to claim 2, wherein
   said receiving part has an end face provided with an integral collar,
   wherein said integral collar engages positive-lockingly said support frame.

4. The component according to claim 2, further comprising a sealing element that is arranged between said support frame and said second housing part.

5. The component according to claim 4, wherein
said second housing part has an end face provided with a circumferentially extending housing step,
wherein an end face of said support frame resting on said second housing part and said housing step delimit a groove and
wherein said sealing element is arranged in said groove.

6. The component according to claim 2, wherein said releasable connection is a latching connection.

7. The component according to claim 2, wherein said releasable connection is a positive-locking connection.

8. The component according to claim 7, wherein
said positive-locking connection comprises a step provided on said receiving part,
wherein said support frame rests against said step.

9. The component according to claim 7, wherein
said positive-locking connection comprises a step provided on said support frame,
wherein said receiving part rests against said step.

10. The component according to claim 2 as part of an intake system.

11. The component according to claim 2 in the form of an air filter.

12. The component according to claim 11, comprising a filter element inserted into an interior delimited by said first and second housing parts.

13. The component according to claim 11, further comprising a sealing element that is arranged on said filter element and positioned between said support frame and said second housing part.

14. The component according to claim 13, wherein
said second housing part has an end face provided with a circumferentially extending housing step,
wherein an end face of said support frame resting on said second housing part and said housing step delimit a groove and
wherein said sealing element is arranged in said groove, said groove having an opening facing inwardly into an interior of said air filter housing.

15. The component according to claim 1, wherein said receiving part slides freely along said second housing part.

16. The component according to claim 1, wherein
said releasable connection sidewall provided on said support frame or on said receiving part is deformable in a direction transverse to said sliding direction.

17. The component according to claim 16, wherein said wall is provided on said receiving part.

* * * * *